April 15, 1930.   L. S. BAIER   1,754,707
MATERIAL FOR BUILDING AND OTHER PURPOSES
Filed Jan. 19, 1929   2 Sheets-Sheet 1

INVENTOR
L. S. Baier.
BY
ATTORNEY

April 15, 1930.  L. S. BAIER  1,754,707
MATERIAL FOR BUILDING AND OTHER PURPOSES
Filed Jan. 19, 1929  2 Sheets-Sheet 2
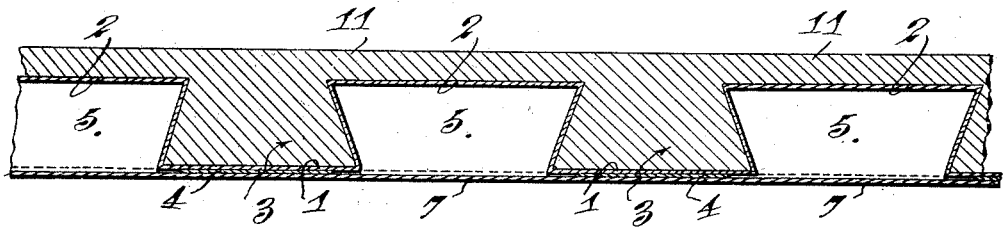
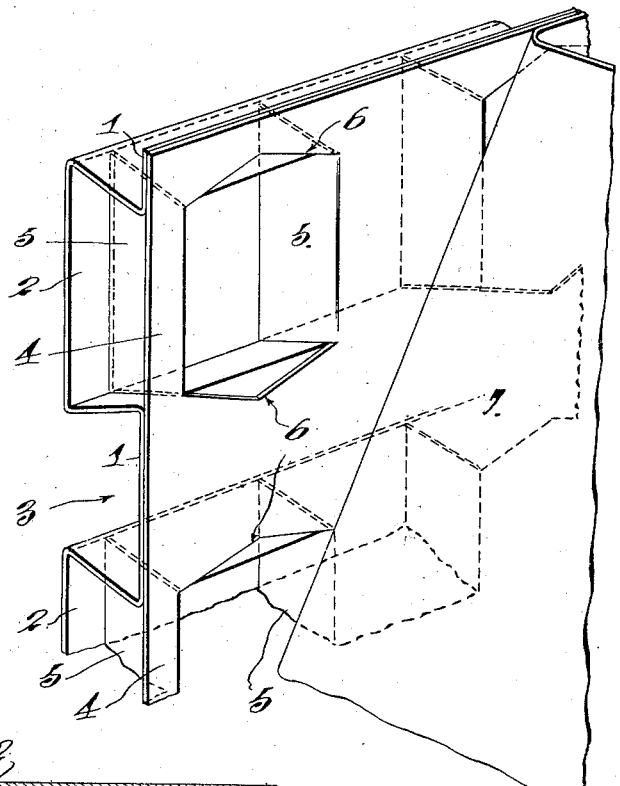
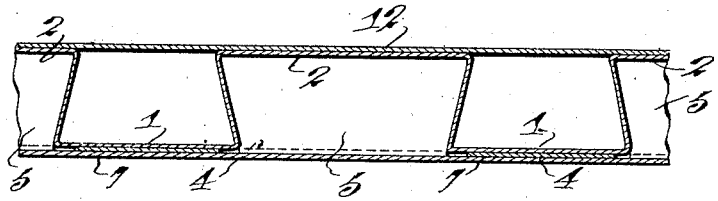
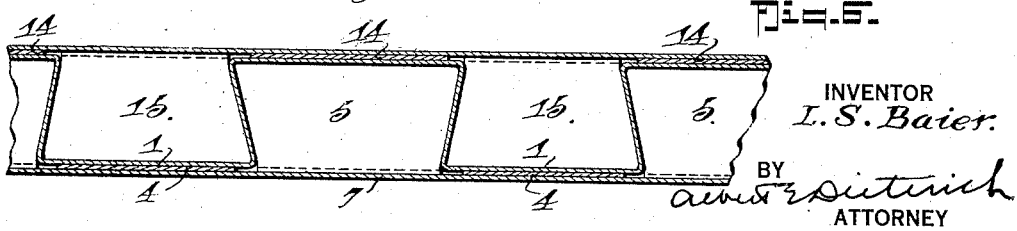
INVENTOR
L. S. Baier.
BY
ATTORNEY Patented Apr. 15, 1930

1,754,707

UNITED STATES PATENT OFFICE

LUDWIG S. BAIER, OF PORTLAND, OREGON

MATERIAL FOR BUILDING AND OTHER PURPOSES

Application filed January 19, 1929. Serial No. 333,601.

My invention relates principally to building material and particularly to the broad class of plaster bases or lathing.

It has for its objects to provide a light, strong, sound deadening and heat insulating material to be used as a base for applying plaster, stucco, cement and similar materials used in building construction; to provide means whereby a contractor or builder may more accurately estimate the job; to provide means whereby construction costs of buildings may be reduced through reduction in material and labor outlay; to provide means to keep out moisture and eliminate water spots now so common in plastered walls; to provide a simple and effective heat insulator and sound muffler in wall structures; to provide a building material of the character above stated which, when covered by plaster, etc., becomes a substantial fire resistant; to provide such a material for the purposes stated that can be made in various widths, but preferably of standard width to accommodate itself to standard studding; to provide such widths with interlocking edge elements whereby neat joints may be produced to eliminate bulges and cracking of the plaster; to provide for the elimination of the unsightly lath marks now so common in plastered lath structures; to provide a material embodying the aforesaid characteristics which also lends itself easily to shaping, and which may be cut with shears and shaped into cones, disks and other forms at a great saving in costs and with highly satisfactory results; to provide a material which may readily be applied over corners without corner jointing and thus eliminate cracks in the plaster at wall or wall and ceiling intersections and whereby corner beads may be eliminated; to provide an article that may be used as the base for plaster board; to provide a material for the purposes above stated which may be made water and fire-proof; to provide a material which may be used in the manufacture of boxes, cartons, etc.; to provide a material that may be employed in successive layers for heat insulating pipe coverings, also in lining refrigerators, cold storage compartments, ice cream cabinets and other places where cork board insulation is now employed.

Other objects will in part be obvious and in part be pointed out hereinafter.

To the attainment of the aforesaid objects and ends, my invention consists in the novel features of construction and in the combination, connection and arrangement of parts, hereinafter more fully described and then pointed out in the claims.

In the drawings:

Figure 3 is an enlarged vertical section on the line 3—3 of Figure 1.

Figure 4 is a detail inverted perspective view of a portion of the material with the backing layer loosened to show the reinforcing or intermediate layer.

Figure 5 is a detail section of a modification of the invention.

Figure 6 is a detail section similar to Figure 5 of another modification.

Figure 1:
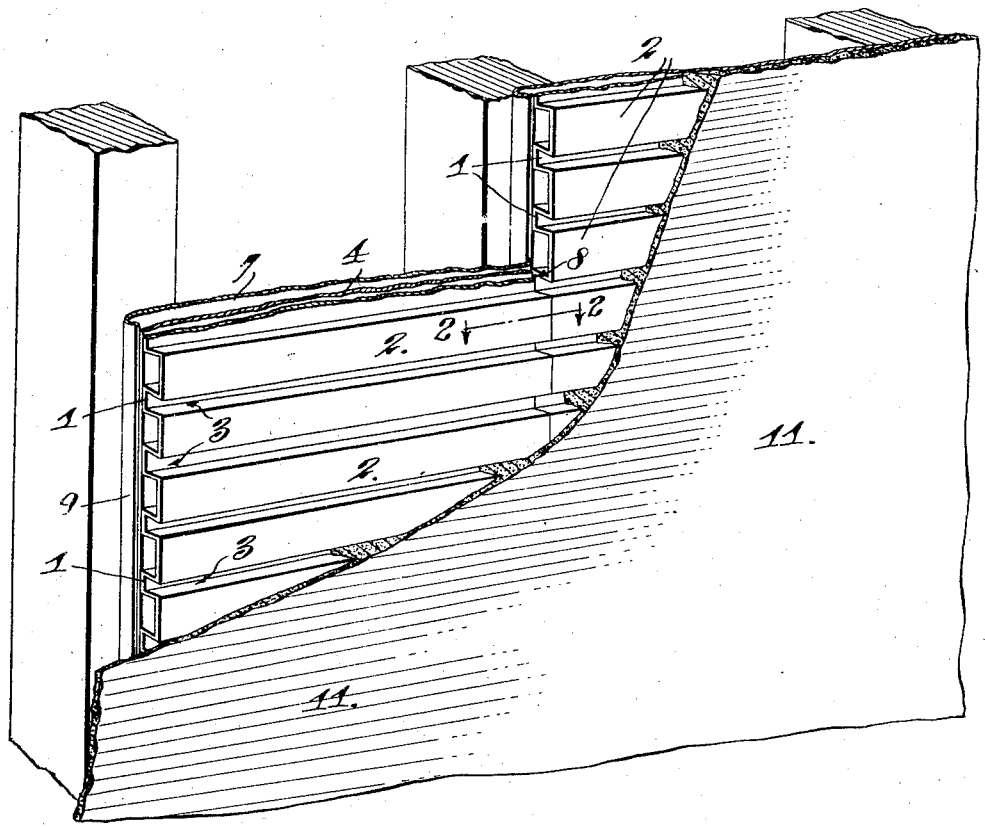
Figure 1 is a perspective view of a section of a wall with my invention applied as lathing.

In the drawings in which like numerals of reference indicate like parts in all of the figures, 1 represents a sheet of pliable material such as stiff paper which may, for certain purposes, be water-proof paper such as a tar paper or ordinary heavy paper coated with a water-proofing paint or composition, or it may be made, for certain purposes, of paper stock rendered fire-proof by means of suitable fire-proofing compositions. This sheet 1, in its employment in my invention, is provided with a series of parallel corrugations to form upstanding parallel ribs 2 with intervening grooves 3. The ribs 2 and grooves 3 are preferably of dove-tail form in cross section, this being the preferred embodiment of the invention. Over the back surface of the sheet 1 is placed a reinforcing sheet 4 from which is stamped, at suitable intervals, wings 5, the outline of which conforms to the cross sectional outline of the ribs 2, and the wings 5 preferably snugly fit the cross section of the ribs 2 and divide the ribs into a series of dead air pockets for heat insulation purposes.

Stamping the wings from the sheet 4 leaves a hexagonal opening 6 across which the base portions of the ribs 2 extend, see Figure 4, whereby the wings 5 securely interlock with the ribs 2.

The sheet 4 may be made of any of the materials above specified for sheet 1.

7 is a backing sheet also made of any of the materials specified for sheet 1 and the backing sheet is placed over the sheet 4.

The sheets 1, 4 and 7 are secured in integral relation to one another by any suitable means as for instance cementing the sheets together. Where the material used embodies asphaltum, tar or some other adhesive substance in its composition, when the sheets 1, 4 and 7 are assembled they may be warmed up to cause their adhesive substances to merge, and thus not only cement the sheets together but also to cement the edges of the wings 5 to the ribs 2, and thereby assist in maintaining the wings in planes normal to the axes of the ribs 2, thus affording maximum strength as transverse braces within the ribs as well as functioning to divide the interior of the ribs into dead air pockets 10. The grooves 3 are preferably of lesser cross sectional area than that of the ribs 2 and constitute interlocking grooves for the reception of the plaster 11. As the capacity of the grooves 3 is uniform throughout the material, it is evident that only a definite amount of plaster can be used in laying the wall over the material employed as a lathing or as a base for plaster board, thereby avoiding waste of plaster such as now occurs where spaced laths over studding are used.

Figure 2:
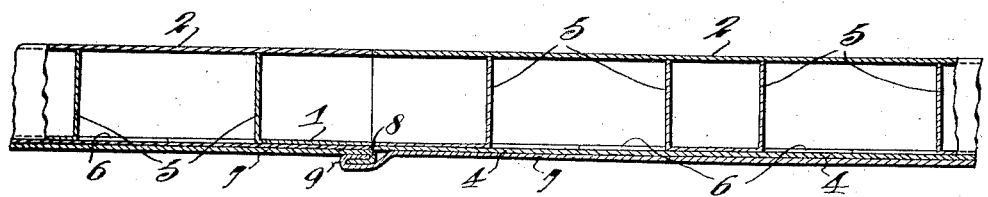
Figure 2 is an enlarged horizontal section on the line 2—2 of Figure 1.

It will also be seen that the backing sheet 7 extends beyond the side ends of the ribs 2 and has one edge turned downwardly and back upon itself as at 8 and the other edge turned upwardly and bock upon itself as at 9, the structure being such that the material may be made in long lengths and when two lengths are laid side by side over studding the edges 8 and 9 of adjacent lengths may be interlocked as indicated in Figure 2, thus producing joints between adjacent lengths which will maintain their alignment at all times and prevent cracking of the plaster. In applying the lengths to studding, the material is nailed to the studding by nails 13 driven through the material within the grooves 3.

Where the material is used in severe climates two or more layers may be placed over the studding and thus increase the heat insulating properties of the wall.

By placing a facing sheet 12 over the ribs 2 and securing it thereto by cementing or other suitable means as indicated in Figure 5, the material may be used in box and carton manufacture, since the provision of the wings 5 within the ribs 2 provides an exceptionally rigid structure. If desired an intermediate reinforcing strip 14 may be placed over the ribs 2 and provided with wings 15 similar to the wings 5, the wings 15 lying in the grooves 3 and reinforcing the structure there, this being a modification of the invention particularly useful in box manufacture and is indicated in Figure 6 of the drawings.

By constructing the material of paper sheets of thicknesses and weight suitable for the purpose for which it is to be employed it can be readily cut by the use of shears to any form desired. It is also flexible or bendable to conform to various contours found in building structures.

While I prefer to make my material of paper stock rather than of metal it is obvious that for some purposes it may be desirable to use sheet metal and I therefore do not, except where specifically stated in the claims, desire to confine myself or limit myself in this application to the use of paper stock exclusively.

It is obvious that where a cheaper structure is desired and the use of so many dead air spaces is not essential, the backing sheet 7 may be omitted, though I prefer to employ that backing sheet as it enables me to provide the entire lengths of the ribs with dead air pockets.

It is also obvious that my material may be used as the base for making plaster board, the material spread upon the base being any of the usual compositions employed in plaster board structures.

From the foregoing description, taken in connection with the accompanying drawings, it is thought that the construction and uses of my invention will be clear to those skilled in the art.

What I claim is:

1. In material of the character described, a sheet having parallel corrugations producing alternate ribs and grooves, a reinforcing sheet secured to one face of said corrugated sheet and having flaps conforming in cross section to the cross section of the ribs, said flaps extending from said reinforcing sheets into and transversely of said ribs.

2. In material of the character described, a sheet having parallel corrugations producing alternate ribs and grooves, a reinforcing sheet secured to one face of said corrugated sheet and having flaps conforming in cross section to the cross section of the ribs, said flaps extending from said reinforcing sheets into and transversely of said ribs, said flaps being of an area substantially equal to the cross sectional area of the internal space of the ribs so as to fit the same.

3. In material of the character described, a sheet having parallel corrugations producing alternate ribs and grooves, a reinforcing sheet secured to one face of said corrugated sheet and having flaps conforming in cross section to the cross section of the ribs, said flaps extending from said reinforcing sheets into and transversely of said ribs, and a backing sheet secured over said reinforcing sheet.

4. In material of the character described, a sheet having parallel corrugations producing alternate ribs and grooves, a reinforcing sheet secured to one face of said corrugated sheet and having flaps conforming in cross section to the cross section of the ribs, said flaps extending from said reinforcing sheets into and transversely of said ribs, said flaps being cut from said reinforcing sheet, thereby leaving openings in said reinforcing sheet.

5. In material of the character described, a sheet having parallel corrugations producing alternate ribs and grooves, a reinforcing sheet secured to one face of said corrugated sheet and having flaps conforming in cross section to the cross section of the ribs, said flaps extending from said reinforcing sheets into and transversely of said ribs, said flaps being cut from said reinforcing sheet, thereby leaving openings in said reinforcing sheet, and a backing sheet secured over said reinforcing sheet to close said openings.

6. In material of the character described, a sheet having parallel corrugations producing alternate ribs and grooves, a reinforcing sheet secured to one face of said corrugated sheet and having flaps conforming in cross section to the cross section of the ribs, said flaps extending from said reinforcing sheets into and transversely of said ribs, a backing sheet secured over said reinforcing sheet, and means securing said sheets together into a unitary structure.

7. In material of the character described, a sheet having parallel corrugations producing alternate ribs and grooves, a reinforcing sheet secured to one face of said corrugated sheet and having flaps conforming in cross section to the cross section of the ribs, said flaps extending from said reinforcing sheets into and transversely of said ribs, a backing sheet secured over said reinforcing sheet, and means securing said sheets together into a unitary structure and securing said flaps in position in said ribs.

8. In material of the class described, a sheet having parallel corrugations constituting alternate ribs and grooves, a reinforcing sheet over one face of said corrugated sheet, flaps carried by said reinforcing sheet and interlocked with and projecting into said ribs and lying transversely thereof, thereby providing spaced transverse partitions in the length of the ribs.

9. In material of the class described, a sheet having parallel corrugations constituting alternate ribs and grooves, a reinforcing sheet over one face of said corrugated sheet, flaps carried by said reinforcing sheet and interlocked with and projecting into said ribs and lying transversely thereof, thereby providing spaced transverse partitions in the length of the ribs, and a backing sheet over said reinforcing sheet, all being arranged whereby the spaces in said ribs between said flaps constitute dead air pockets.

10. In material of the class described, a pliable sheet having parallel corrugations constituting alternate ribs and grooves, a pliable reinforcing sheet over one face of said corrugated sheet, flaps carried by said reinforcing sheet and interlocked with and projected into said ribs and located transversely thereof, thereby providing spaced transverse partitions in the length of the ribs, and a pliable backing sheet over said reinforcing sheet, all being arranged whereby the spaces in said ribs between said flaps constitute dead air pockets, and means for securing said sheets into an integral structure.

11. In material of the class described, a pliable sheet having parallel corrugations constituting alternate ribs and grooves, a pliable reinforcing sheet over one face of said corrugated sheet, flaps carried by said reinforcing sheet and interlocked with and projected into said ribs and located transversely thereof, thereby providing spaced transverse partitions in the length of the ribs, and a pliable backing sheet over said reinforcing sheet, all being arranged whereby the spaces in said ribs between said flaps constitute dead air pockets, said sheets being composed of paper containing an adhesive, the adhesives of several sheets being united to hold said sheets together as a unitary structure.

12. In material of the class described, a pliable sheet having parallel corrugations constituting alternate ribs and grooves, a pliable reinforcing sheet over one face of said corrugated sheet, flaps carried by said reinforcing sheet and interlocked with and projected into said ribs and located transversely thereof, thereby providing spaced transverse partitions in the length of the ribs, and a pliable backing sheet over said reinforcing sheet, all being arranged whereby the spaces in said ribs between said flaps constitute dead air pockets, said sheets being composed of waterproofed material.

13. In material of the class described, a pliable sheet having parallel corrugations constituting alternate ribs and grooves, a pliable reinforcing sheet over one face of said corrugated sheet, flaps carried by said reinforcing sheet and interlocked with and projected into said ribs and located transversely thereof, thereby providing spaced transverse partitions in the length of the ribs, and a pliable backing sheet over said reinforcing sheet, all being arranged whereby the spaces in said ribs between said flaps constitute dead air pockets, said sheets being composed of fireproofed material.

14. In material of the class described, a pliable sheet having parallel corrugations constituting alternate ribs and grooves, a pliable reinforcing sheet over one face of said corrugated sheet, flaps carried by said reinforcing sheet and interlocked with and projected into said ribs and located transversely thereof, thereby providing spaced transverse partitions in the length of the ribs, and a pliable backing sheet over said reinforcing sheet, all being arranged whereby the spaces in said ribs between said flaps constitute dead air pockets, said sheets being composed of water and fire-proofed material.

15. In material of the class described, a sheet having parallel corrugations constituting alternate ribs and grooves, a reinforcing sheet over one face of said corrugated sheet, flaps carried by said reinforcing sheet and projecting into said ribs and lying transversely thereof, thereby providing spaced transverse partitions in the length of the ribs.

16. In material of the class described, a sheet having parallel corrugations constituting alternate ribs and grooves, a reinforcing sheet over one face of said corrugated sheet, flaps carried by said reinforcing sheet and projecting into said ribs and lying transversely thereof, thereby providing spaced transverse partitions in the length of the ribs, and a backing sheet over said reinforcing sheet, all being arranged whereby the spaces in said ribs between said flaps constitute dead air pockets.

LUDWIG S. BAIER.